(12) United States Patent
Goh et al.

(10) Patent No.: US 11,633,257 B2
(45) Date of Patent: Apr. 25, 2023

(54) DENTAL MILLING TOOL

(71) Applicant: Prima Dental Manufacturing Ltd, Gloucester (GB)

(72) Inventors: Wan Tsin Goh, Bristol (GB); Graham Handbury, Stroud (GB)

(73) Assignee: Prima Dental Manufacturing Ltd

( * ) Notice: Subject to any disclaimer, the term of this patent is extended or adjusted under 35 U.S.C. 154(b) by 889 days.

(21) Appl. No.: 16/402,808

(22) Filed: May 3, 2019

(65) Prior Publication Data

US 2019/0365502 A1    Dec. 5, 2019

(30) Foreign Application Priority Data

May 8, 2018  (GB) .......................... 1807472

(51) Int. Cl.
*A61C 3/02* (2006.01)
*A61C 8/00* (2006.01)

(52) U.S. Cl.
CPC .............. *A61C 3/02* (2013.01); *A61C 8/0089* (2013.01)

(58) Field of Classification Search
CPC .............................. A61C 13/02; A61C 8/0089
USPC ..................................... 433/165–166; 407/53
See application file for complete search history.

(56) References Cited

U.S. PATENT DOCUMENTS

| | | | | |
|---|---|---|---|---|
| 4,285,618 A * | 8/1981 | Shanley, Jr. | ............... | B23C 5/10 407/57 |
| 7,186,063 B2 * | 3/2007 | Volokh | ...................... | B23C 5/10 407/53 |
| 8,366,354 B2 * | 2/2013 | Davis | ........................ | B23C 5/10 407/53 |
| 2006/0067797 A1 * | 3/2006 | Calamia | .................... | B23C 5/10 407/53 |
| 2007/0172321 A1 * | 7/2007 | Nagai | ................... | B23C 5/1009 407/53 |

(Continued)

FOREIGN PATENT DOCUMENTS

| | | |
|---|---|---|
| CA | 2987541 A1 | 12/2017 |
| CN | 104551173 A | 4/2015 |

(Continued)

OTHER PUBLICATIONS

Search Report from German Patent Office for Application No. GB 1807472.4 dated Oct. 26, 2018.
International Search Report and Written Opinion for Application No. PCT/GB2019/051242 dated Jul. 22, 2019.

*Primary Examiner* — Matthew M Nelson
(74) *Attorney, Agent, or Firm* — St. Onge Steward Johnston & Reens LLC

(57) ABSTRACT

The invention provides a dental milling tool for milling dental materials in the making of dental prostheses. The dental milling tool is a ball-nose end mill having three helical flutes, each flute being associated with a cutting edge, each cutting edge having chip breakers along the curved edges of the ball. The dental milling tool may be formed from a hard material such as carbide based material, ceramic, cermet, superhard materials including polycrystalline diamond (PCD) and cubic boron nitride (CBN), and diamond composite. Alternatively, the dental milling tool may be coated with a hard coating such as diamond coating, diamond-like-carbon (DLC), nitride based coating such as titanium aluminium nitride (TiAlN), aluminium titanium nitride, (AlTiN), and titanium nitride (TiN), and ceramic coating.

20 Claims, 2 Drawing Sheets

(56) References Cited

U.S. PATENT DOCUMENTS

| | | | |
|---|---|---|---|
| 2008/0206000 A1* | 8/2008 | Sasu | B23C 3/18 |
| | | | 407/53 |
| 2011/0211922 A1* | 9/2011 | Maeda | B23C 5/1009 |
| | | | 407/54 |
| 2012/0009543 A1* | 1/2012 | Meier | A61C 3/02 |
| | | | 433/165 |
| 2013/0039709 A1* | 2/2013 | Goh | B23B 51/02 |
| | | | 408/230 |
| 2015/0209054 A1* | 7/2015 | Atabey | B23C 5/003 |
| | | | 606/80 |
| 2016/0192945 A1* | 7/2016 | Scianamblo | A61B 17/1615 |
| | | | 606/80 |
| 2017/0341162 A1* | 11/2017 | Watanabe | B23C 5/16 |
| 2018/0290219 A1* | 10/2018 | Hufschmied | B23C 5/1009 |
| 2019/0365502 A1* | 12/2019 | Goh | B23C 5/1009 |

FOREIGN PATENT DOCUMENTS

| | | | | |
|---|---|---|---|---|
| CN | 106270701 A | | 1/2017 | |
| EP | 1820589 A1 | | 8/2007 | |
| EP | 3213846 A1 | | 9/2017 | |
| GB | 2573524 A | * | 11/2019 | A61C 3/02 |
| JP | 6112627 U | | 1/1986 | |
| JP | 2003225822 A | | 8/2003 | |
| WO | 2005102572 A1 | | 11/2005 | |
| WO | 2010050391 A1 | | 5/2010 | |
| WO | 2016136820 A1 | | 9/2016 | |
| WO | 2017211462 A1 | | 12/2017 | |
| WO | 2018168341 A1 | | 8/2019 | |
| WO | 2019003965 A1 | | 6/2020 | |

* cited by examiner

DENTAL MILLING TOOL

FIELD OF THE INVENTION

The present invention relates to a dental milling tool, and in particular a dental milling tool which is capable of milling dental materials such as zirconia (in a pre-sintered state), polymethyl methacrylate (PMMA), and resin matrix dental materials.

BACKGROUND OF THE INVENTION

In dentistry, it is often necessary to replace part of a tooth after the tooth has been partially removed, or to replace a removed tooth if the tooth is not restorable. Partial replacements include crowns, inlays and onlays, and should match the original shape of the tooth as closely as possible. Entire replacement teeth are normally fitted to an implant which is implanted in the bone of the jaw, and must fit onto the implant as closely as possible. These replacements (partial and entire) will be referred to hereinafter as "dental prostheses".

Historically, such dental prostheses were made by hand by a dental technician. As the dental prostheses took some time to make, it was not normally possible to achieve replacement of part of a tooth in a single dental appointment. Instead, at a first appointment, information about the required shape of the dental prosthesis would be gathered (normally requiring the dentist to take an impression of the patient's teeth). The dental prosthesis would then be made, and would be fitted at a second appointment. The overall process was time consuming.

More recently, this process has been improved using computer-assisted-design (CAD) and computer-assisted-manufacturing (CAM) technology. The patient's dentition is scanned using an intra-oral scanner to produce a digital model, and the digital model is then used to specify the necessary dental prosthesis to be designed and made. The dental prosthesis can then be made from a dentally acceptable material (such as zirconia). This step of making the dental prosthesis normally involves milling or grinding of a dental prosthesis to the designed CAD digital model using dental milling tools in a dental computer-numerical-control (CNC) machine (such as those supplied by Roland DG of Japan). If the dental prosthesis is being machined from zirconia, then the milled dental prosthesis is sintered to achieve its full density.

Dentally acceptable materials such as zirconia are abrasive, and hence the dental milling tools used to machine the dental prosthesis are subject to wear. Many factors can affect the accuracy of the dental prosthesis, such as the machine spindle, the tool holder, the program, the milling tools, and so on. With regard to the milling tools, the accuracy of the dental prosthesis produced is largely dependent on tool precision, as well as tool resistance to wear (in particular abrasive wear) when machining dental materials. A dental milling tool with higher wear resistance will have a longer tool life, and will not need to be replaced as frequently as a dental milling tool with lower wear resistance.

SUMMARY OF THE INVENTION

According to a first aspect of the present invention, there is provided a dental milling tool for milling dental materials in the making of dental prostheses, wherein: the dental milling tool is a ball-nose end mill having three helical flutes, each flute being associated with a cutting edge, each cutting edge having chip breakers along the curved edges of the ball; and the dental milling tool is formed from a hard material such as carbide based material, ceramic, cermet, superhard materials including polycrystalline diamond (PCD) and cubic boron nitride (CBN), and diamond composite.

It has been found that this combination of tool geometry and tool material leads to a longer tool life for the tool. Further, the use of chip breakers on the cutting edges leads to a reduced cutting force (and so a longer tool life), and also improves the consistency of the performance of the tool.

Using a hard coating on the tool can also improve tool life. Accordingly, according to a second aspect of the present invention, there is provided a dental milling tool for milling dental materials in the making of dental prostheses, wherein: the dental milling tool is a ball-nose end mill having three helical flutes, each flute being associated with a cutting edge, each cutting edge having chip breakers along the curved edges of the ball; and the dental milling tool is coated with a hard coating such as diamond coating, diamond-like-carbon (DLC), nitride based coating such as titanium aluminium nitride (TiAlN), aluminium titanium nitride, (AlTiN), and titanium nitride (TiN), and ceramic coating.

The helix angle of the helical flutes can be any desired value. However, it has been found that a helix angle of between 10° and 50° is particularly suitable for a dental milling tool, and so in a preferred form, the helical flutes have a helix angle of between 10° and 50°. In a particularly preferred form, the helix angle is 35°.

The helix angle may vary along the flute, or may be constant along the flute.

To improve performance, the tool may have a rake angle, and in a preferred form, the rake angle is between 5° and 20°.

Similarly, the tool may have a relief angle, and in a preferred form, the relief angle is between 10° and 25°.

The chip breakers can be provided in any suitable manner. In a preferred form, the chip breakers are formed as notches along the curved cutting edges of the ball.

BRIEF DESCRIPTION OF THE DRAWINGS

A preferred embodiment of the invention will now be described by way of example only and with reference to the accompanying drawings, in which.

DETAILED DESCRIPTION OF THE INVENTION

Figure 1:
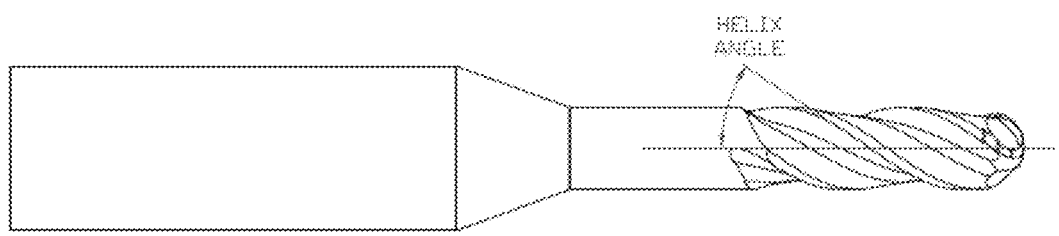
FIG. 1 is a side view of a dental milling tool according to the invention, showing the helix angle.
Figure 2:
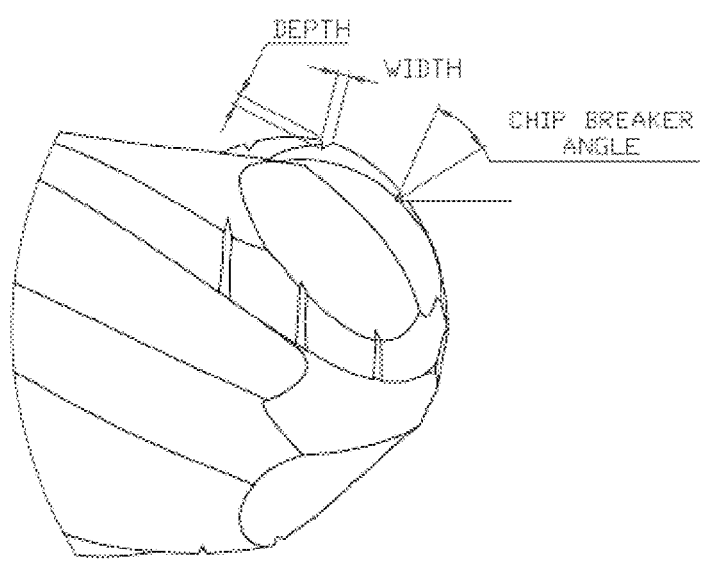
FIG. 2 is an enlarged side view of the tip of the dental milling tool of FIG. 1, showing the chip breakers.
Figure 3:
FIG. 3 is a cross-sectional view of the dental milling tool of FIG. 1, showing the tool relief and rake angle.

The dental milling tools shown in FIGS. 1 to 3 are suitable for use in CAD/CAM dentistry. In particular, the tools can be used to mill zirconia dental material into the appropriate shape for a dental prosthesis, based on a CAD model, before the zirconia is sintered to produce the dental prosthesis. The tools are ball nose end mills, and the head diameter of the ball-nose may be in the range from 0.3 mm to 8 mm. The tools most commonly used in dental milling have head diameters of 0.3 mm, 0.6 mm, 0.7 mm, 1 mm, 2 mm and 2.5 mm.

A plurality of helical flutes are provided to allow chips of material removed from the workpiece by a cutting edge associated with the flute to move away from the workpiece. In the invention, as shown in FIG. 3, there are three flutes (and so three cutting edges). The angle of the helix affects the cutting force generated during cutting, and for dental milling tools, the helix angle should be between 10° and 50°. A helix angle of 35° is particularly preferred. The helix angle may be constant along the flute, or may vary. The helices of the flutes may be left-handed or right-handed.

The rake angle of the tool at the cutting edge, as shown in FIG. 3, is between 5° and 20°. Each cutting edge also has a relief angle as shown in FIG. 3, preferably of between 10° and 25°. The tool could also have multiple reliefs.

The dental milling tool also uses chip breakers (most clearly shown in FIG. 2). Chip breakers are used on cutting tools to ensure that material removed from the workpiece is removed as small pieces, rather than as one continuous piece (called a "chip"); this chip is often seen when milling PMMA material in the absence of chip breakers. A long chip can on occasion cause problems (for example, by wrapping around the cutting tool or the workpiece), and so it is desirable to break up the continuous chip to avoid such problems.

The milling of zirconia usually produces dust rather than continuous chips, and so it would be expected that little benefit, if any, would be derived from using chip breakers on a dental milling tool when cutting zirconia. However, it has surprisingly been found that using chip breakers can reduce cutting force in the direction of cutting, at least during the cutting of zirconia. A reduced cutting force means that there is less resistance to the cutting of the workpiece, and this reduction in resistance leads to a reduction in the rate of wear of the tool. It will thus take a longer time for the tool to become worn to an unacceptable level, and the tool will have a longer tool life.

In the tool of FIGS. 1 to 3, the chip breakers are formed as a series of notches arranged along the curved cutting edges of the ball, as best shown in FIG. 2.

In a specific example, a dental milling tool as shown in FIGS. 1 to 3 (having three flutes and chip breakers, and a ball nose diameter of 2 mm) was used to mill zirconia dental material. The dental milling tool was formed from an uncoated carbide based material. A similar prior art dental milling tool having two flutes, no chip breakers, and a ball nose diameter of 2 mm, and formed from an uncoated carbide based material, was also used to mill zirconia dental material. The cutting forces in the direction of cutting were measured and compared.

Each tool was tested using a 5-axis Spinner U5-620 cutting machine, and the cutting force was measured using a Kistler dynamometer. The cutting conditions were as follows:
  Speed: 19,900 revolutions per minute
  Feed rate: 2,100 millimetres per minute
  Axial depth of cut: 1.0 millimetre
  Radial depth of cut: 0.71 millimetre Under these conditions, the average cutting force measured for the dental milling tool as shown in FIGS. 1 to 3 was 46% lower than the cutting force measured for the prior art dental milling tool (0.43 N as compared to 0.80 N). A reduction in cutting force of this nature, achieved as a result of tool geometry and in particular the provision of chip breakers, will tend to increase the working life of the tool.

A further advantageous effect of using chip breakers is that the measured cutting force is more consistent between tools; that is, there is less variation of the cutting force from tool to tool if chip breakers are used.

To illustrate this, three different types of tools were tested using a 5-axis Spinner U5-620 cutting machine, and the cutting force was measured using a Kistler dynamometer, as before. The three types of tool tested were (i) a dental milling tool as shown in FIGS. 1 to 3, having three flutes and chip breakers, a ball nose diameter of 2 mm, and a diamond coating; (ii) a prior art dental milling tool having two flutes, no chip breakers, a ball nose diameter of 2 mm, and a diamond coating; and (iii) a prior art dental milling tool having three flutes, no chip breakers, a ball nose diameter of 2 mm, and a diamond coating.

Several of each type of tool were tested, and the maximum and minimum cutting forces measured for each type of tool was recorded. These maximum and minimum cutting forces were then used to calculate the force deviation for each type of tool (that is, the difference between the largest cutting force recorded for each type of tool and the smallest cutting force recorded for each type of tool).

The measured force deviations were as follows:
  Type (i): 0.56 N
  Type (ii): 0.71 N
  Type (iii): 0.77 N Thus, the provision of chip breakers reduces the force deviation between tools, and makes the performance of the tool more consistent and more predictable.

The rate of wear of the tool, particularly abrasive wear, can be further reduced (thus further increasing the tool life) by increasing the hardness of the tool substrate or by coating the tool with a coating harder than the substrate. This can be done by using a hard material or superhard material to form the tool (a "hard substrate" tool), or by coating the tool with a hard or superhard coating (a "hard coating" tool).

Suitable tool substrate materials include, but are not limited to, hard materials such as carbide based materials, ceramic, cermets, and superhard materials such as polycrystalline diamond (PCD) and cubic boron nitride (CBN).

Suitable tool coating include, but are not limited to, diamond coating, diamond-like-carbon (DLC), nitride based coatings such as titanium aluminium nitride (TiAlN), aluminium titanium nitride, (AlTiN) and titanium nitride (TiN), and ceramic coatings. The adhesion of the coating to the tool substrate is a key factor which affects the tool life of a coated tool, and so it is very important that the coating adheres well to the tool. The choice of tool substrate and coating is thus very important.

Improved tool life is thus achieved by a combination of tool geometry and hard tool substrate, or a combination of tool geometry and a hard tool coating.

As an example of the improved tool life, tests were carried out to compare dental milling tools of the invention with prior art dental milling tools.

Specifically, two tests were carried out using dental milling tools as shown in FIGS. 1 to 3. The first test was to provide evidence that the use of a hard tool substrate increased tool life. The second test was to provide evidence that the use of a hard coating (harder than the tool substrate), combined with a suitable tool substrate, would further improve tool life.

Both tests were carried out using a Roland DWX52DC dental milling machine. Roland dental milling machines are the most widely used type of dental milling machines, and so carrying out the test using this machine allows the actual operation of a dental laboratory to be mimicked as closely as possible.

In the tests, dental milling tools according to the invention with three flutes and chip breakers, and head diameters of 1 mm and 2 mm were used. A dental milling tool with two flutes, no chip breakers and a head diameter of 0.6 mm was also used in the test. Dental milling tools with head diameters of 2 mm, 1 mm and 0.6 mm are normally used together as a set in dental labs to manufacture prostheses.

The aim of the test was to evaluate the quality of machining on the dental prosthesis, and in particular at the margin of the prosthesis. When chipping at the margin of the prosthesis was found, the test was stopped and the number of prostheses (or "restorations") produced was determined. The margin of the prosthesis is produced by tools with head diameters of 2 mm and 1 mm; a tool with a head diameter of 0.6 mm would not be used on the margin. Hence, the test was suitable for evaluating the performance of ball nose end mills with three flutes and chip breakers, as in the invention.

The cutting conditions for each diameter of ball nose were as follows:

| Ball nose diameter (mm) | Revolutions per minute (rpm) | Feed rate (mm/min) | Depth of cut (mm) |
| --- | --- | --- | --- |
| 2 | 20,000 | 1,500 to 1,800 | 0.5 to 0.8 |
| 1 | 25,000 | 1,500 to 2,000 | 0.08 |
| 0.6 | 30,000 | 500 to 600 | 0.05 |

In the first test, machining was carried out using uncoated dental milling tools according to the invention with three flutes and chip breakers, and head diameters of 1 mm and 2 mm, and an uncoated dental milling tool with two flutes, no chip breakers and a head diameter of 0.6 mm. Machining was also carried out with the same dental milling machine and cutting conditions, but with prior art uncoated dental milling tools (with two flutes and no chip breakers), and ball nose diameters of 2 mm, 1 mm and 0.6 mm. Further, the dental milling tools according to the invention were formed from a tool substrate material that was at least 14% harder than the material of the prior art dental milling tools.

The results of the first test found that the prior art dental milling tools would be able to complete 98 restorations. The uncoated dental milling tools of FIGS. 1 to 3 as described above would be able to complete 126 restorations (29% more).

The second test corresponded to the first test, but was carried out using diamond coated tools. The dental milling tools of the invention were formed from tungsten carbide with between 4% and 12% cobalt content, coated with a diamond coating. This combination of substrate and coating provides good coating adhesion. The prior art dental milling tools were formed from diamond coated tungsten carbide. Two sets of prior art dental milling tools, from two different manufacturers, were used in the second test.

Figure 4:
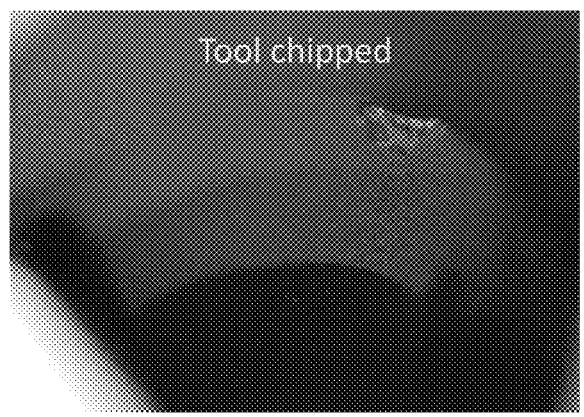
FIG. 4 is a view of chipping damage on a prior art tool.

The result of the second test found that the prior art coated dental milling tools from the first manufacturer would be able to complete 644 restorations. One of the prior art coated dental milling tools from the second manufacturer was chipped at the cutting edge (as shown in FIG. 4) after 28 restorations. Once a tool is chipped, it should not be used further, as the quality of restorations would be adversely affected, and the spindle of the milling machine may be damaged, and so the test of the tools from the second manufacturer was stopped.

The coated dental milling tools of the invention as described above would be able to complete at least 854 restorations. The test was stopped at this point, although the tools could have been used to carry out further restorations.

Although the invention has been specifically described with regard to a single form of chip breaker, it will be appreciated that other forms of chip breaker may also be used (although some experimentation may be required to determine the most effective form of chip breaker to be used).

Further, although only certain materials have been suggested for use as the tool substrate or the coating, it will be appreciated that other materials of high hardness, or lower cost materials such as high speed steel, could also be used.

What is claimed is:

1. A dental milling tool for milling dental materials in the making of dental prostheses, comprising:
   the dental milling tool is a ball-nose end mill with a diameter of 0.03 mm-8 mm and having precisely two or precisely three helical flutes, each flute being associated with a cutting edge, each cutting edge having chip breakers along the curved edges of the ball; and
   the dental milling tool is formed from a hard material selected from the group consisting of: carbide based material, ceramic, cermet, superhard materials including polycrystalline diamond (PCD) and cubic boron nitride (CBN), and diamond composite.

2. The dental milling tool as claimed in claim 1, wherein the helical flutes have a helix angle of between 10° and 50°.

3. The dental milling tool as claimed in claim 2, wherein the helix angle is 35°.

4. The dental milling tool as claimed in claim 2, where the helix angle is constant along the flute.

5. The dental milling tool as claimed in claim 2, where the helix angle varies along the flute.

6. The dental milling tool as claimed in claim 1, having a rake angle of between 5° and 20°.

7. The dental milling tool as claimed in claim 1, having a relief angle of between 10° and 25°.

8. The dental milling tool as claimed in claim 1, wherein the chip breakers are formed as notches along the curved cutting edges of the ball.

9. The dental milling tool of claim 1 wherein the dental milling tool has precisely three helical flutes.

10. A dental milling tool for milling dental materials in the making of dental prostheses, wherein:
    the dental milling tool is a ball-nose end mill having a diameter of 0.3 mm-8 mm and having precisely two or precisely three helical flutes, each flute being associated with a cutting edge, each cutting edge having chip breakers along the curved edges of the ball; and
    the dental milling tool is coated with a hard coating selected from the group consisting of: diamond coating, diamond-like-carbon (DLC), nitride based coating such as titanium aluminium nitride (TiAlN), aluminium titanium nitride, (AlTiN), and titanium nitride (TiN), and ceramic coating.

11. The dental milling tool as claimed in claim 10, wherein the helical flutes have a helix angle of between 10° and 50°.

12. The dental milling tool as claimed in claim 11, wherein the helix angle is 35°.

13. The dental milling tool as claimed in claim 11, where the helix angle is constant along the flute.

14. The dental milling tool as claimed in claim 11, where the helix angle varies along the flute.

15. The dental milling tool as claimed in claim 10, having a rake angle of between 5° and 20°.

16. The dental milling tool as claimed in claim 10, having a relief angle of between 10° and 25°.

17. The dental milling tool as claimed in claim 10, wherein the chip breakers are formed as notches along the curved cutting edges of the ball.

18. The dental milling tool of claim 10 wherein the dental milling tool has precisely three helical flutes.

19. A method of milling dental materials comprising:
provided a dental milling material;
milling said dental milling material with a dental milling tool in forming a dental prostheses, the dental milling tool comprising:
a ball-nose end mill with a diameter of 0.3 mm-8 mm and having precisely two or precisely three helical flutes, each flute being associated with a cutting edge, each cutting edge having chip breakers along the curved edges of the ball; and
the dental milling tool is formed from a hard material selected from the group consisting of: carbide based material, ceramic, cermet, superhard materials including polycrystalline diamond (PCD) and cubic boron nitride (CBN), diamond composite, diamond coating, diamond-like-carbon (DLC), nitride based coating such as titanium aluminium nitride (TiAlN), aluminium titanium nitride, (AlTiN), and titanium nitride (TiN), and ceramic coating.

20. The method of claim 19 wherein the dental milling tool has precisely three helical flutes.

* * * * *